United States Patent
Yasumoto

(10) Patent No.: US 10,191,349 B2
(45) Date of Patent: Jan. 29, 2019

(54) REFLECTIVE DISPLAY APPARATUS

(71) Applicant: Alpine Electronics, Inc., Tokyo (JP)

(72) Inventor: Takashi Yasumoto, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 62 days.

(21) Appl. No.: 15/591,391

(22) Filed: May 10, 2017

(65) Prior Publication Data

US 2018/0024409 A1 Jan. 25, 2018

(30) Foreign Application Priority Data

Jul. 25, 2016 (JP) .................. 2016-145658

(51) Int. Cl.
*G02F 1/00* (2006.01)
*B60K 35/00* (2006.01)
*B60R 1/00* (2006.01)
*G02F 1/163* (2006.01)
*G02B 27/01* (2006.01)
*G02F 1/157* (2006.01)
*G06K 9/00* (2006.01)
*B60R 1/04* (2006.01)
*B60R 1/08* (2006.01)
*B60R 1/12* (2006.01)
*G02F 1/133* (2006.01)

(52) U.S. Cl.
CPC ............. *G02F 1/163* (2013.01); *B60K 35/00* (2013.01); *B60R 1/00* (2013.01); *B60R 1/04* (2013.01); *B60R 1/088* (2013.01); *B60R 1/12* (2013.01); *G02B 27/0101* (2013.01); *G02F 1/1506* (2013.01); *G02F 1/157* (2013.01); *G06K 9/00791* (2013.01); *B60K 2350/2013* (2013.01); *B60K 2350/2034* (2013.01); *B60K 2350/352* (2013.01); *B60R 2001/1253* (2013.01); *B60R 2300/20* (2013.01); *B60R 2300/8066* (2013.01); *G02F 1/13318* (2013.01); *G02F 2001/13312* (2013.01); *G02F 2201/44* (2013.01); *G02F 2201/58* (2013.01); *G02F 2203/02* (2013.01)

(58) Field of Classification Search
CPC ............ G02F 1/163; B60K 35/00; B60R 1/00
USPC ........................................................ 348/148
See application file for complete search history.

(56) References Cited

U.S. PATENT DOCUMENTS

| 8,339,526 | B2 | 12/2012 | Minikey, Jr. et al. | |
|---|---|---|---|---|
| 2004/0075920 | A1* | 4/2004 | Nakaho | G02F 1/1525 359/838 |
| 2006/0050356 | A1* | 3/2006 | Varaprasad | B60R 1/12 359/265 |
| 2017/0184894 | A1* | 6/2017 | Hayashi | G02B 27/0172 |
| 2017/0355313 | A1* | 12/2017 | Park | B60R 1/088 |

FOREIGN PATENT DOCUMENTS

| JP | A2005-231605 | 2/2005 |
|---|---|---|
| JP | 2009-529452 A | 8/2009 |

* cited by examiner

*Primary Examiner* — Jeffery A Williams
(74) *Attorney, Agent, or Firm* — Brinks Gilson & Lione

(57) ABSTRACT

A reflective display apparatus includes an image display panel including a liquid crystal panel and a backlight unit, a half mirror, and an electrochromic panel arranged in a layered manner. When the image display panel stops operating and power supply to the electrochromic panel is stopped, the half mirror reflects light coming from the rear of a vehicle and the reflected light is directed rearward. The reflected light enables a driver to check a situation behind the vehicle under such conditions.

5 Claims, 4 Drawing Sheets

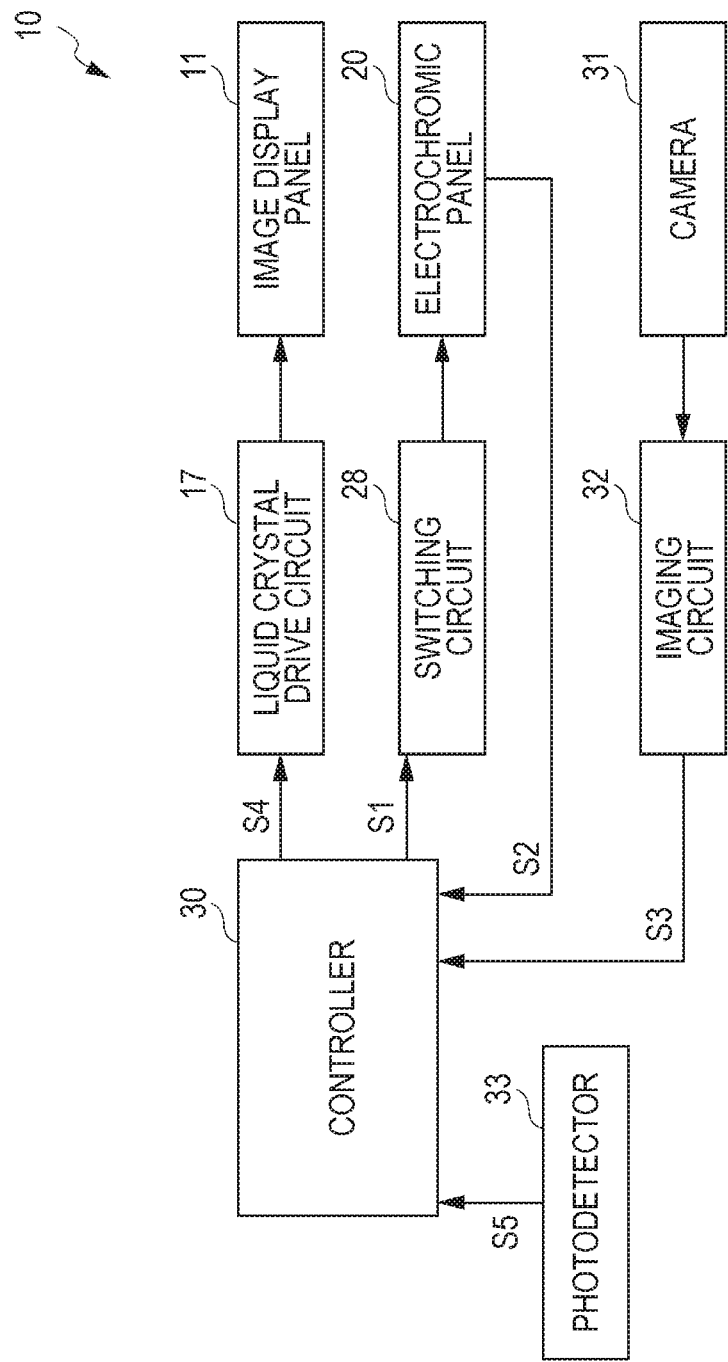

REFLECTIVE DISPLAY APPARATUS

RELATED APPLICATION

The present application claims priority to Japanese Patent Application Number 2016-145658, filed Jul. 25, 2016, the entirety of which is hereby incorporated by reference.

BACKGROUND

1. Field

The present disclosure relates to a reflective display apparatus that includes an image display panel for displaying, for example, a captured image of an area behind a vehicle and that has a reflecting function.

2. Description of the Related Art

Japanese Unexamined Patent Application Publication No. 2005-231605 and Japanese Unexamined Patent Application Publication (Translation of PCT Application) No. 2009-529452 disclose reflective display apparatuses for viewing an image of an area behind a vehicle.

A rearward checking apparatus disclosed in Japanese Unexamined Patent Application Publication No. 2005-231605 is a side-view mirror including a half mirror and a liquid crystal display disposed at the rear of the half mirror. A vehicle is provided with a rearward-looking camera for capturing an image of an area behind the vehicle. The liquid crystal display displays an image captured by the rearward-looking camera. Since the image displayed by the liquid crystal display passes through the half mirror, the displayed image and an image reflected by the half mirror are combined into an image.

The rearward checking apparatus disclosed in Japanese Unexamined Patent Application Publication No. 2005-231605 enables a driver to visually check a situation hidden by part of a vehicle body in a manner similar to that using a typical side-view mirror.

A rearview assembly disclosed in Japanese Unexamined Patent Application Publication (Translation of PCT Application) No. 2009-529452 includes a mirror element and a video display disposed at the rear of the mirror element. As described in Japanese Unexamined Patent Application Publication (Translation of PCT Application) No. 2009-529452, exemplary combinations of the video display and the mirror element include a combination of a liquid crystal display and an electrochromic mirror element.

The rearview assembly disclosed in Japanese Unexamined Patent Application Publication (Translation of PCT Application) No. 2009-529452 is configured as follows. Under high ambient light conditions, the electrochromic mirror element is operated so that a reflected image is visible. Under low ambient light conditions, the electrochromic mirror element is stopped and the liquid crystal display is operated instead of the electrochromic mirror element so that an image displayed by the liquid crystal display is visible.

The rearward checking apparatus disclosed in Japanese Unexamined Patent Application Publication No. 2005-231605 provides a combined image of the image displayed by the liquid crystal display and the image reflected by the half mirror. Under high ambient light conditions outside the vehicle, the image displayed by the liquid crystal display is not clearly visible and the image reflected by the half mirror is not clearly provided, so that it is difficult for the driver to reliably visually check a situation behind the vehicle. Since the rearward checking apparatus, serving as a side-view mirror, is disposed on the exterior of the vehicle, it is particularly difficult to display a clear combined image.

The rearview assembly disclosed in Japanese Unexamined Patent Application Publication (Translation of PCT Application) No. 2009-529452 can provide a relatively clear reflected image of a situation behind the vehicle under high ambient light conditions by using the electrochromic mirror element. To continue a reflecting operation of the electrochromic mirror element, however, voltage has to be continuously applied across electrodes.

If the engine is turned off and the application of voltage across the electrodes is accordingly stopped, the electrochromic mirror element does not function as a mirror element. Furthermore, if power supply is stopped, the liquid crystal display is also stopped, so that there is no means for helping a driver to check a situation behind the vehicle. The same problem occurs during an idle reduction mode during which the engine is stopped while the vehicle is temporarily stopped during travel. During the idle reduction mode, the driver cannot check a situation behind the vehicle, leading to reduced safety of the vehicle during travel. In addition, continuous power supply to the electrochromic mirror element or the liquid crystal display during the idle reduction mode results in an excessive power consumption.

Furthermore, the electrochromic mirror element may not be operated due to failure of the electrochromic mirror element or an electric system. In such an emergency, the driver cannot view a reflected image of a situation behind the vehicle. If such an emergency occurs under high ambient light conditions, such as daytime, in which it is hard to see an image displayed by the liquid crystal display, it is very dangerous.

SUMMARY

The present disclosure has been made to solve the above-described problems in the art. The present disclosure provides a reflective display apparatus capable of providing a reflected image of a situation, for example, behind a vehicle, if power supply to an electrochromic panel is shut off or if the electrochromic panel fails.

According to an aspect of the present disclosure, a reflective display apparatus includes an image display panel, an electrochromic panel disposed adjacent to a display side of the image display panel, and a half mirror disposed between the image display panel and the electrochromic panel.

In this aspect, preferably, the electrochromic panel includes two opposed transparent substrates, a transparent electrode disposed on an inner surface of each of the transparent substrates, and an electrolyte layer interposed between the opposed transparent electrodes. The electrolyte layer contains a metal ion. The metal ion is deposited on one of the transparent electrodes in response to application of voltage across the transparent electrodes, so that the electrochromic panel becomes a reflective panel.

In this aspect, the half mirror may have a reflectance of 10% to 40%.

The apparatus according to this aspect may further include a camera that captures an image of an area behind a vehicle. The captured image of the area behind the vehicle can be displayed by the image display panel.

The apparatus according to this aspect may further include a controller that controls the image display panel and the electrochromic panel and a photodetector that senses external light. When the photodetector senses a light intensity below a predetermined value, the controller may perform a first control to drive the image display panel without applying voltage across the electrodes of the electrochromic panel. When the photodetector senses a light intensity at or above the predetermined value, the controller may perform a second control to apply the voltage across the electrodes of the electrochromic panel without driving the image display panel.

In this aspect, preferably, when application of the voltage across the electrodes of the electrochromic panel is stopped during the second control, the controller continues a state in which the image display panel is not driven.

In the reflective display apparatus according to this aspect of the present disclosure, while voltage is applied across the electrodes of the electrochromic panel, the electrochromic panel functions as a reflective panel. When the voltage application to the electrodes of the electrochromic panel is stopped, the electrochromic panel becomes a light transmissive panel. The image display panel is operated so that an image displayed by the image display panel is visible.

When the voltage application to the electrodes of the electrochromic panel is stopped while the electrochromic panel has to function as a reflective panel, the image display panel is kept stopped and a display screen of the image display panel is in black or a dark color so that an image reflected by the half mirror is visible. Consequently, a reflected image can be viewed at all times during stopping of the engine of the vehicle, during the idle reduction mode, or if the electrochromic panel has an abnormality in operation.

In addition, since the half mirror has a low reflectance of 10% to 40%, an image displayed by the image display panel is clearly visible while the image display panel is in operation. While a display operation of the image display panel is stopped, the half mirror can provide reflected light having a predetermined intensity.

BRIEF DESCRIPTION OF THE DRAWINGS

FIG. 4 is a circuit block diagram of the reflective display apparatus according to an embodiment of the present disclosure.

DESCRIPTION OF THE PREFERRED EMBODIMENTS

Configuration of Reflective Display Apparatus 10

Figure 1:
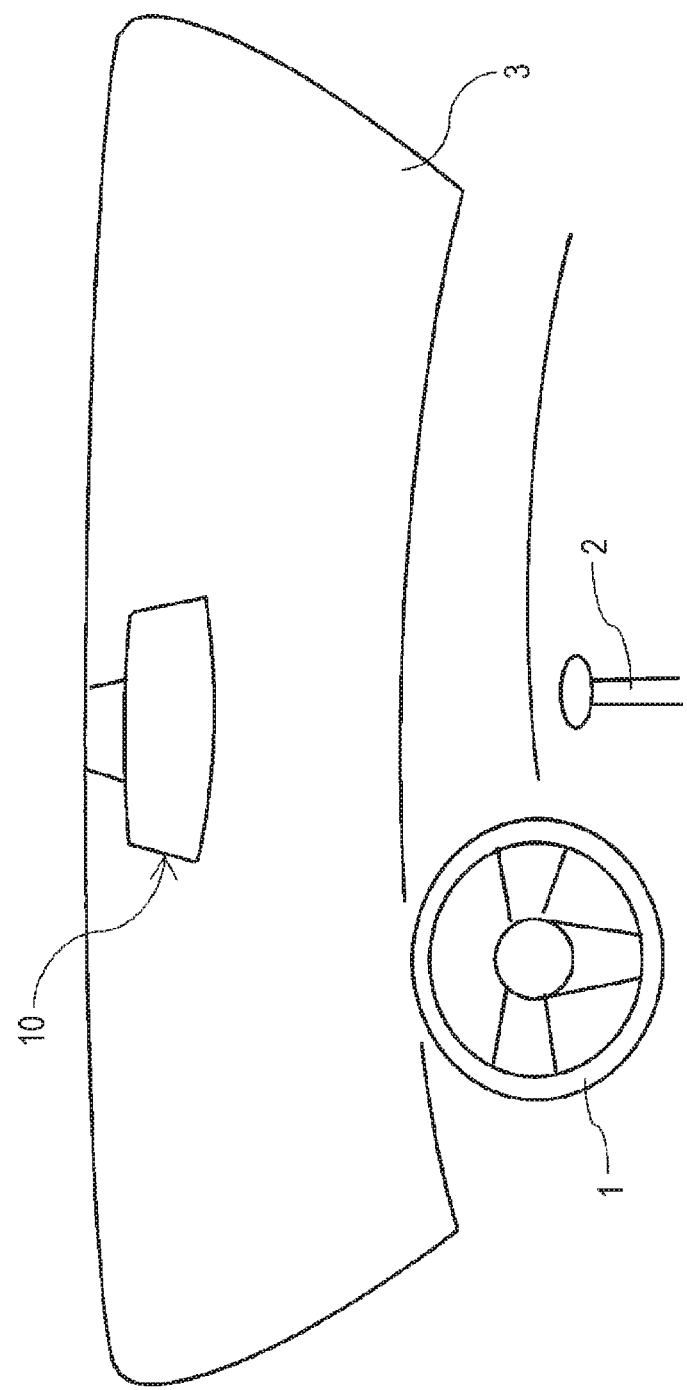
FIG. 1 is a diagram explaining a reflective display apparatus according to an embodiment of the present disclosure and illustrates the apparatus used as a rear-view mirror of a vehicle.

FIG. 1 illustrates a reflective display apparatus 10 according to an embodiment of the present disclosure. FIG. 1 illustrates a steering wheel 1, a shift lever 2, and a windshield 3 when viewed from a vehicle interior of an automobile. In the present embodiment, the reflective display apparatus 10 is used as a rear-view mirror of the automobile and is disposed adjacent to an upper end of the windshield 3.

The reflective display apparatus 10 according to the present disclosure is not limited to the rear-view mirror. The reflective display apparatus 10 can be used as a door mirror (side-view mirror). Furthermore, the reflective display apparatus 10 can be used to reflect or display an image of a scene to the rear of a vehicle other than the automobile, for example, a train or a two-wheeler.

Figure 2:
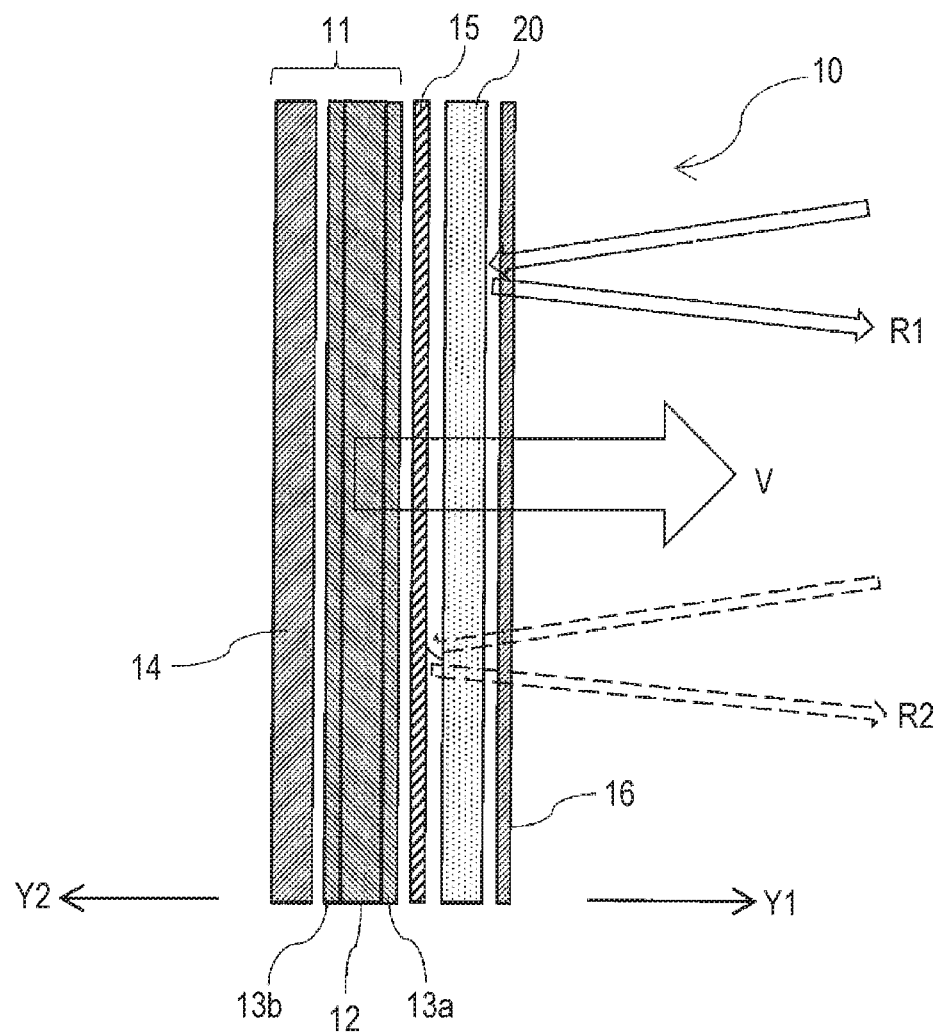
FIG. 2 is a cross-sectional view illustrating an exemplary configuration of the reflective display apparatus according to an embodiment of the present disclosure.

FIG. 2 is a cross-sectional view of an exemplary configuration of the reflective display apparatus 10. In FIG. 2, a casing that accommodates components of the reflective display apparatus 10 is not illustrated. Although the components of the reflective display apparatus 10 are illustrated with gaps between adjacent components in FIG. 2, it is preferred that the components accommodated in the casing be arranged with gaps as small as possible or be in contact without gaps.

In FIG. 2, the Y1 direction is a direction in which the reflective display apparatus 10 faces the vehicle interior, that is, a rearward direction toward the rear of the vehicle, or reflection direction. The Y2 direction is a forward direction toward the front of the vehicle, or the direction of travel of the vehicle and is opposite to the reflection direction.

The reflective display apparatus 10 includes an image display panel 11 located farthest in the Y2 direction opposite to the reflection direction. The image display panel 11 includes a liquid crystal panel 12, a front polarizer 13a located farther in the Y1 direction than the liquid crystal panel 12, a rear polarizer 13b located farther in the Y2 direction than the liquid crystal panel 12, and a backlight unit 14 located farther in the Y2 direction than the rear polarizer 13b. The liquid crystal panel 12 is a transmissive panel capable of providing color display. Display light V emitted from the backlight unit 14 passes through the liquid crystal panel 12 and travels in the Y1 direction.

The image display panel 11 may be any self-light-emitting display panel, such as an electroluminescent display panel or a plasma display panel.

Furthermore, a half mirror 15 and an electrochromic panel 20 are arranged in that order in the Y1 direction in front of the image display panel 11. In addition, a front panel 16 is disposed on the surface of the electrochromic panel 20 facing in the Y1 direction.

The half mirror 15 has a reflectance less than 50%, or a reflectance of 10% to 40%, preferably 10% to approximately 30%. In the present embodiment, the reflectance is 20%. The front panel 16 is a transparent panel. In some embodiments, a translucent touch sensor capable of detecting a change in capacitance to determine the position of an approaching finger may further be disposed on the surface of the front panel 16 facing in the Y2 direction.

Figure 3:
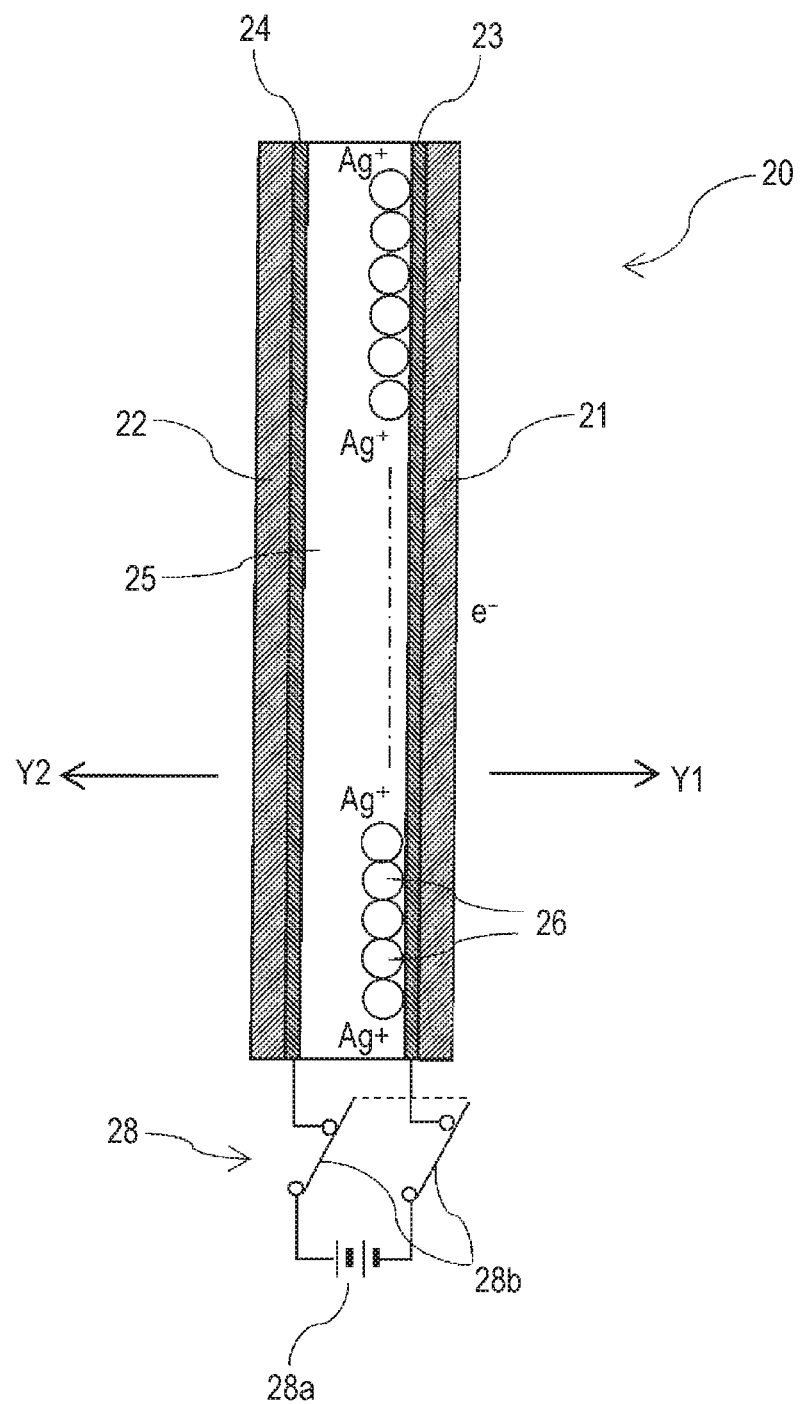
FIG. 3 is a cross-sectional view of an electrochromic panel included in the reflective display apparatus according to an embodiment of the present disclosure.

FIG. 3 is a cross-sectional view of an exemplary configuration of the electrochromic panel 20. The electrochromic panel 20 includes a transparent substrate 21 facing in the Y1 direction and a transparent substrate 22 facing in the Y2 direction such that the transparent substrates 21 and 22 are opposed parallel to each other. The transparent substrates 21 and 22 are, for example, glass substrates. The transparent substrate 21 has a transparent electrode 23 on an inner surface of the substrate. The transparent substrate 22 has a transparent electrode 24 on an inner surface of the substrate. Each of the transparent electrodes 23 and 24 is formed of, for example, an indium tin oxide (ITO) layer.

An electrolyte layer 25 is interposed between the transparent electrodes 23 and 24. The electrolyte layer 25 contains a metal ion. In the present embodiment illustrated in FIG. 3, the metal ion is a silver cation 26. In some embodiments, any of the transparent electrodes 23 and 24 may be an ion supply electrode for providing (precipitating) a metal ion upon voltage application.

Referring to FIGS. 3 and 4, the electrochromic panel 20 is connected to a switching circuit 28. The switching circuit 28 includes a direct current power supply 28a and a switch element 28b capable of simultaneously switching the transparent electrodes 23 and 24 between connection to the direct current power supply 28a and disconnection therefrom. When the switch element 28b is turned on and voltage is applied across the transparent electrodes 23 and 24, reduction occurs at the transparent electrode 23, serving as a cathode, and oxidation occurs at the transparent electrode 24, serving as an anode. Consequently, the silver cations 26 are deposited on the transparent electrode 23, so that the electrochromic panel 20 functions as a reflective panel.

When the voltage application to the transparent electrodes 23 and 24 is stopped and there is no difference in potential between the transparent electrodes 23 and 24, reduction and oxidation do not occur, so that the electrochromic panel 20 becomes a light transmissive panel.

FIG. 4 is a block diagram of the reflective display apparatus 10 according to the present embodiment of the present disclosure. The reflective display apparatus 10 includes a controller 30. The controller 30 includes, as major components, a central processing unit (CPU) and a memory. The controller 30 provides a switching signal S1 to the switching circuit 28. In addition, an information signal S2 concerning an operation state of the electrochromic panel 20 is fed back to the controller 30.

The reflective display apparatus 10 includes a video camera 31 for capturing an image of a scene behind the vehicle. A signal obtained by an imaging element, such as a charge-coupled device (CCD), included in the video camera 31 is sent to an imaging circuit 32. A video signal S3 generated by the imaging circuit 32 is provided to the controller 30. The image display panel 11 is driven by a liquid crystal drive circuit 17. The controller 30 provides a display signal S4 to the liquid crystal drive circuit 17. The display signal S4 includes the video signal S3 generated by the imaging circuit 32.

A photodetector 33 is disposed at any position in the vehicle interior or a vehicle exterior. A light intensity signal S5 obtained by the photodetector 33 is provided to the controller 30.

An operation of the reflective display apparatus 10 will now be described below.

Display Operation of Image Display Panel 11

The photodetector 33 in FIG. 4 senses the intensity of ambient light and provides the light intensity signal S5 to the controller 30 at all times. When the controller 30 determines that an intensity indicated by the light intensity signal S5 is less than or equal to a predetermined value or less than the predetermined value, that is, the ambient light has an intensity at or below the predetermined value, the controller 30 provides the switching signal S1 to the switching circuit 28, thus turning off the switch element 28b of the switching circuit 28 in FIG. 3. This stops the voltage application to the transparent electrodes 23 and 24 of the electrochromic panel 20.

Consequently, the silver cations 26 are not deposited on the transparent electrode 23, so that the electrochromic panel 20 becomes a light transmissive panel.

Furthermore, the controller 30 provides the display signal S4 to the liquid crystal drive circuit 17. In response to the display signal S4, the liquid crystal drive circuit 17 is activated to drive the image display panel 11, so that an image of a scene behind the vehicle (in the Y1 direction) captured by the video camera 31 is displayed on the liquid crystal panel 12. Simultaneously, the backlight unit 14 is lit on. As illustrated in FIG. 2, the display light V of the image displayed by the image display panel 11 passes through the half mirror 15, the electrochromic panel 20, and the front panel 16, so that the image of the scene behind the vehicle captured by the video camera 31 is displayed on the reflective display apparatus 10 in FIG. 1.

Reflective Display by Electrochromic Panel 2

When the controller 30 determines that an intensity indicated by the light intensity signal S5 is greater than the predetermined value or greater than or equal to the predetermined value, that is, the ambient light has an intensity at or above the predetermined value, the controller 30 provides the switching signal S1 to the switching circuit 28, thus turning on the switch element 28b of the switching circuit 28 in FIG. 3. Consequently, the voltage is applied across the transparent electrodes 23 and 24 of the electrochromic panel 20.

As a result, the silver cations 26 are deposited on the transparent electrode 23, so that the electrochromic panel 20 functions as a reflective panel.

Furthermore, the display signal S4 is not provided to the liquid crystal drive circuit 17 by the controller 30 and the liquid crystal drive circuit 17 accordingly enters a stop mode, thus stopping the display operation of the image display panel 11. Consequently, as illustrated in FIG. 2, the electrochromic panel 20 reflects light coming from the rear of the vehicle, so that reflected light R1 is directed in the Y1 direction. At this time, the electrochromic panel 20 reflects the light at a much higher reflectance than the half mirror 15.

In this case, the reflective display apparatus 10 in FIG. 1 functions as a reflector. With the reflective display apparatus 10, a driver can check a situation behind the vehicle by perceiving the reflected light R1 in a manner similar to that using a typical rear-view mirror.

When Voltage Application to Electrochromic Panel 20 is Stopped

As described above, while the controller 30 determines that an intensity indicated by the light intensity signal S5 is greater than the predetermined value or greater than or equal to the predetermined value and the display operation of the image display panel 11 is stopped, the voltage is applied across the transparent electrodes 23 and 24 of the electrochromic panel 20 and the reflective display apparatus 10 is used as a reflector under normal conditions.

In the reflective display apparatus 10 installed in the vehicle, however, the voltage application to the transparent electrodes 23 and 24 of the electrochromic panel 20 may be stopped during the above-described operation, for example, when the engine is stopped while the vehicle is stopped, when power supply to the transparent electrodes 23 and 24 is stopped in the idle reduction mode, or when power supply to the transparent electrodes 23 and 24 is stopped due to failure of the electrochromic panel 20 or an electric system.

In this case, the electrochromic panel 20 becomes a light transmissive panel. Since the half mirror 15 is located farther in the Y2 direction than the electrochromic panel 20, light coming from the rear of the vehicle passes through the front panel 16 and the electrochromic panel 20 and is partly reflected by the half mirror 15 as illustrated in FIG. 2. Reflected light R2 is directed in the Y1 direction.

The half mirror 15 has a reflectance of 10% to 40%, preferably 10% to approximately 30%. While the image display panel 11 is stopped, a display screen of the liquid crystal panel 12 is in black or dark color. The reflected light R2 from the half mirror 15 accordingly enables the driver to adequately visually check a scene behind the vehicle when looking the reflective display apparatus 10 in FIG. 1.

While the engine is in an OFF state during stopping of the vehicle such that the voltage application to the transparent electrodes 23 and 24 is stopped, the driver can perceive the reflected light R2 from the reflective display apparatus 10 to confirm safety behind the vehicle before starting the engine.

Furthermore, if the voltage application to the transparent electrodes 23 and 24 of the electrochromic panel 20 is stopped during the idle reduction mode, the driver can confirm safety behind the vehicle. It is therefore unnecessary to supply power to the transparent electrodes 23 and 24 during the idle reduction mode, thus reducing the power consumption.

Additionally, if the electrochromic panel 20 fails and becomes a light transmissive panel due to failure of the electrochromic panel 20 or trouble in a current-carrying path to the electrochromic panel 20 while the electrochromic panel 20 is used as a reflector, the reflected light R2 enables the driver to check a situation behind the vehicle, thus ensuring the safety of driving.

As illustrated in the block diagram of FIG. 4, the information signal S2 indicating information about an operation of the electrochromic panel 20 is provided to the controller 30 at all times. When the controller 30 determines based on the information signal S2 that power is not supplied to the transparent electrodes 23 and 24, the controller 30 performs control to continue a state in which the image display panel 11 does not perform the display operation, regardless of a value indicated by the light intensity signal S5 from the photodetector 33. Consequently, the reflected light R2 from the half mirror 15 enables the driver to confirm safety behind the vehicle regardless of whether the intensity of external light sensed by the photodetector 33 is high or low.

In the reflective display apparatus 10 according to the present embodiment, since the half mirror 15 has a reflectance of 10% to 40%, preferably 10% to approximately 30%, there is no deterioration in display light V passing through the half mirror 15 during operation of the image display panel 11. In addition, while the operation of the image display panel 11 is stopped, the reflected light R2 having an intensity that enables the driver to check a situation behind the vehicle can be directed in the Y1 direction.

What is claimed is:

1. A reflective display apparatus comprising:
   an image display panel;
   an electrochromic panel disposed adjacent to a display side of the image display panel;
   a half mirror disposed between the image display panel and the electrochromic panel;
   a controller that controls the image display panel and the electrochromic panel; and,
   a photodetector that senses external light;
   wherein when the photodetector senses a light intensity below a predetermined value, the controller performs first control to drive the image display panel without applying a voltage across electrodes of the electrochromic panel; and,
   wherein when the photodetector senses a light intensity at or above the predetermined value, the controller performs second control to apply the voltage across the electrodes of the electrochromic panel without driving the image display panel.

2. The apparatus according to claim 1,
   wherein the electrochromic panel includes
   two opposed transparent substrates,
   a transparent electrode disposed on an inner surface of each of the transparent substrates, and
   an electrolyte layer interposed between the opposed transparent electrodes, the electrolyte layer containing a metal ion, and
   wherein the metal ion is deposited on one of the transparent electrodes in response to application of voltage across the transparent electrodes, so that the electrochromic panel becomes a reflective panel.

3. The apparatus according to claim 1, wherein the half mirror has a reflectance of 10% to 40%.

4. The apparatus according to claim 1, further comprising:
   a camera that captures an image of an area behind a vehicle,
   wherein the image display panel is capable of displaying the captured image of the area behind the vehicle.

5. The apparatus according to claim 1, wherein when application of the voltage across the electrodes of the electrochromic panel is stopped during the second control, the controller continues a state in which the image display panel is not driven.

* * * * *